Aug. 23, 1955 W. R. CUMMING 2,716,177
APPARATUS FOR ELECTRIC WELDING
Filed Oct. 20, 1952 5 Sheets-Sheet 1
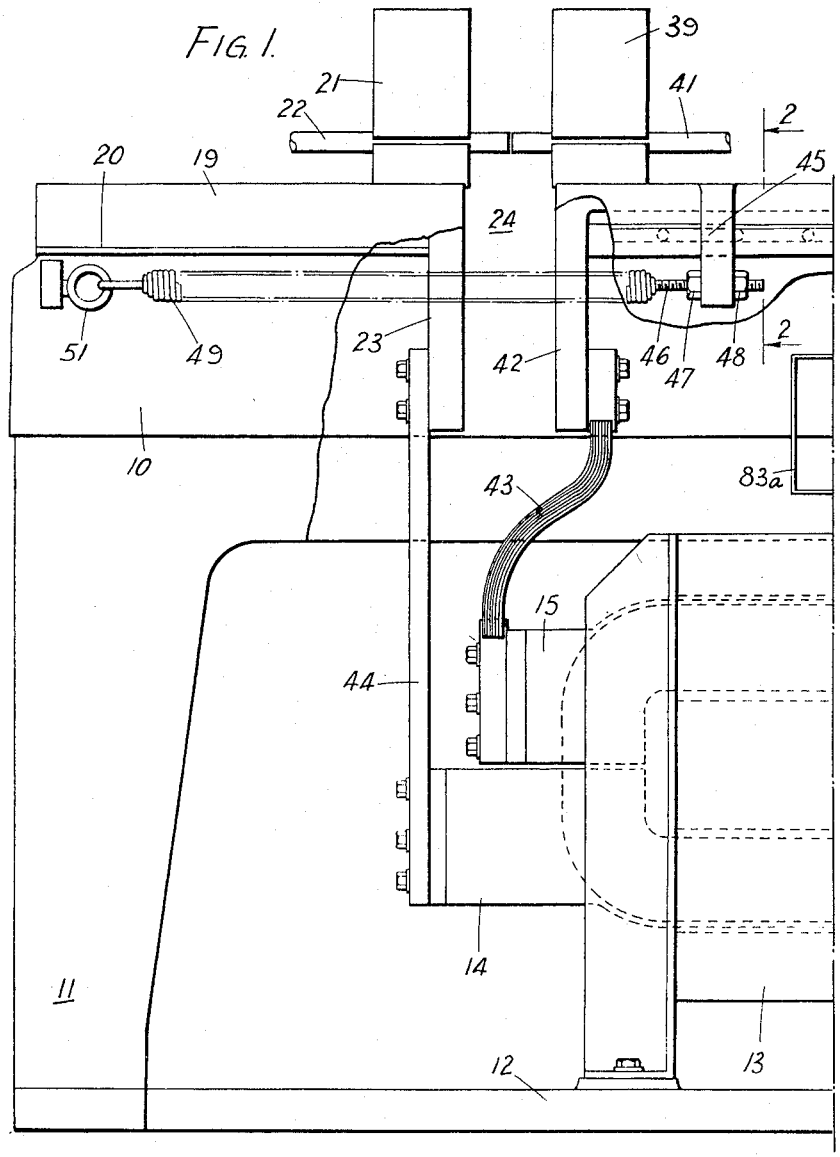
INVENTOR
William Reid Cumming
BY
Stevens, Davis, Miller & Mosher
ATTORNEYS

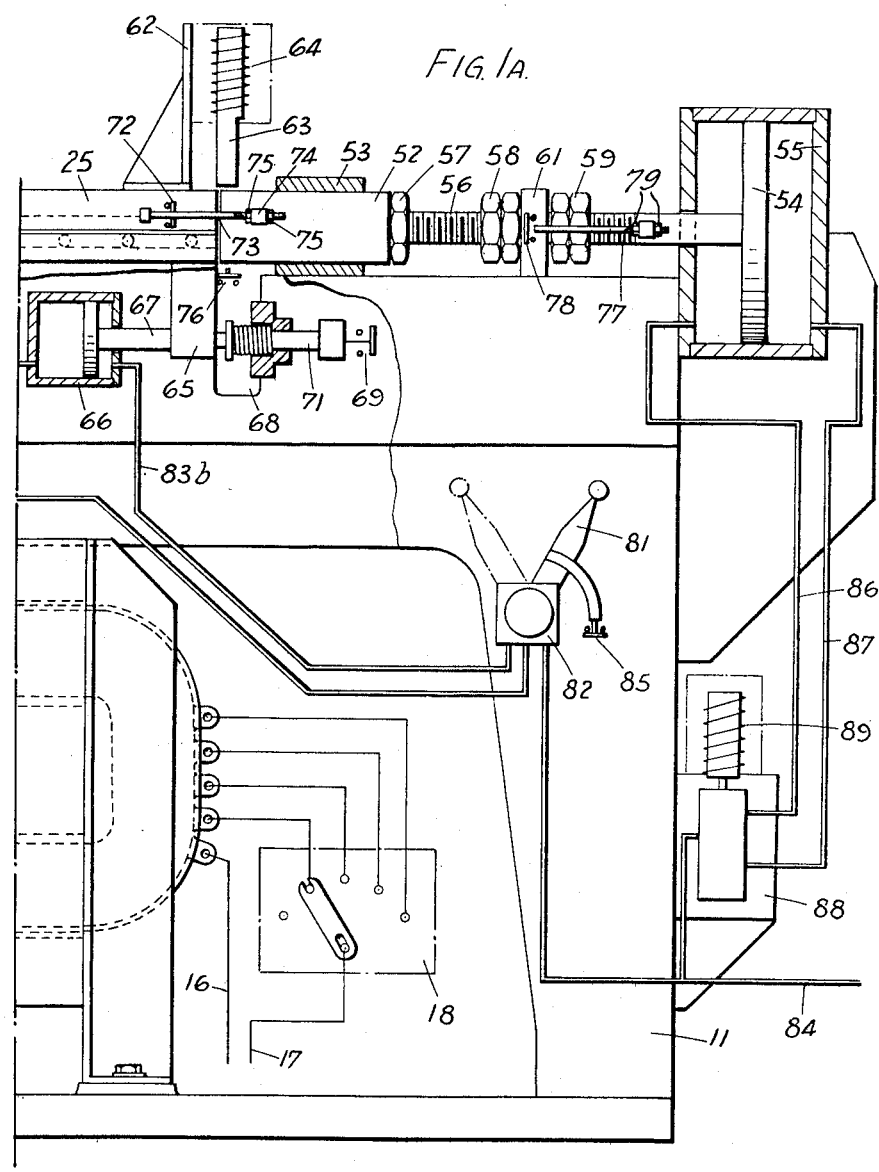

Aug. 23, 1955 W. R. CUMMING 2,716,177
APPARATUS FOR ELECTRIC WELDING
Filed Oct. 20, 1952 5 Sheets-Sheet 3

INVENTOR
William Reid Cumming
BY
Stevens, Davis, Miller & Mosher
his ATTORNEYS

Aug. 23, 1955 W. R. CUMMING 2,716,177
APPARATUS FOR ELECTRIC WELDING
Filed Oct. 20, 1952 5 Sheets-Sheet 4

INVENTOR
William Reid Cumming
BY
Stevens, Davis, Miller & Mosher
his ATTORNEYS

Aug. 23, 1955   W. R. CUMMING   2,716,177
APPARATUS FOR ELECTRIC WELDING
Filed Oct. 20, 1952   5 Sheets-Sheet 5

INVENTOR
William Reid Cumming
BY
Stevens, Davis, Miller & Mosher
his ATTORNEYS

United States Patent Office 2,716,177
Patented Aug. 23, 1955

2,716,177

APPARATUS FOR ELECTRIC WELDING

William Reid Cumming, Inverness, Scotland, assignor to Resistance Welders Limited, Inverness, Scotland Application October 20, 1952, Serial No. 315,672

Claims priority, application Great Britain October 25, 1951

11 Claims. (Cl. 219—4)

This invention relates to flash butt electric welding. The normal process for flash butt electric welding comprises mounting the work pieces to be welded on relatively movable platens or carriages, supplying electricity to the work pieces, moving the work pieces together to cause flashing to take place between them and after a period of flashing when the adjoining ends of the workpieces have attained such a temperature that they are in a plastic state quickly pressing the work pieces together with great force. This latter operation is known as upsetting or butting.

In the simplest method the flashing operation to obtain the greatest heating in the shortest time is under the control of a skilled operator who judges purely by experience the flashing necessary before upsetting. Such a method is, of course, subject to errors on the part of the operators and a perfect weld cannot always be produced.

Automatic flash butt welding machines have been proposed having relatively movable platens or carriages as before and including mechanical or hydraulic means to move the platens together at a predetermined constant speed or with accelerations or decelerations. However, such machines can take no account of variations in the structure of the work pieces and consequently the most efficient flashing is not necessarily correctly maintained. It has also been proposed to employ a servo mechanism controlled by the value of the flashing current to vary the spacing of the workpieces to tend to keep the flashing current constant, but in practice the servo mechanism has a substantial time lag between variation in flashing current and the corresponding movement of the workpiece and for this reason no real advantage is gained over the more conventional machines described above. Where the work pieces are large in size it is not possible to obtain a satisfactory weld using any of the previously mentioned machines in conjunction with a reasonably sized transformer to supply the electricity at the correct voltage, and preheating of the work pieces is resorted to which makes the welding process lengthy and costly.

The main object of the present invention is to provide an apparatus for flash butt welding which allows the most efficient flashing to take place.

A further object of the invention is to eliminate the need for preheating on larger work pieces thus very materially shortening the welding operation.

A further object of the invention is to reduce the size of the welding machine and transformer for a given range of sizes of work piece from the size of the machine and transformer at present necessary and at the same time to produce welded joints of the quality previously produced on bigger machines.

A still further object of the invention is to reduce the quantity of electrical power expended in producing a welded joint.

A still further object of the invention is to eliminate the need for complicated control mechanisms.

In order that the invention may be clearly understood reference is made to the accompanying drawings, in which:

Figure 1 is a diagrammatic view of a welding machine in accordance with the invention using simple repulsion between conductors secured to the carriages;

Figure 2:
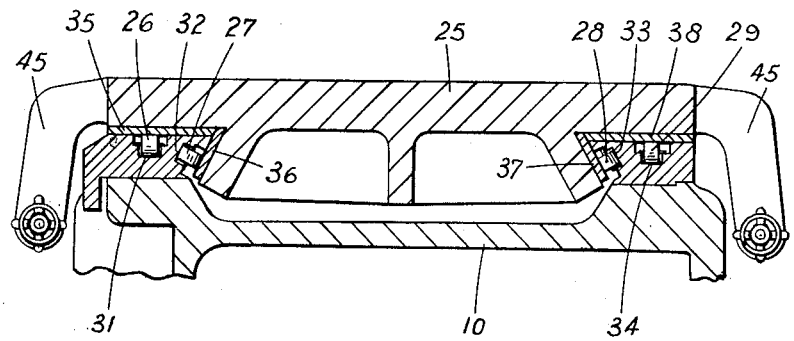
Figures 2 and 3 show cross sections of details of the movable carriages.

Referring now to Figures 1 to 4 of the drawings the machine is mounted on a bed 10 supported by legs 11 from a base plate 12 which is intended to rest on the ground or floor where the machine is positioned. A transformer 13 is secured by bolts to the base plate and occupies a position immediately under the bed 10. The transformer has a heavy current secondary having terminals 14 and 15, the primary being supplied from the alternating current mains through conductors 16 and 17 and a tap adjusting switch 18.

Figure 3:
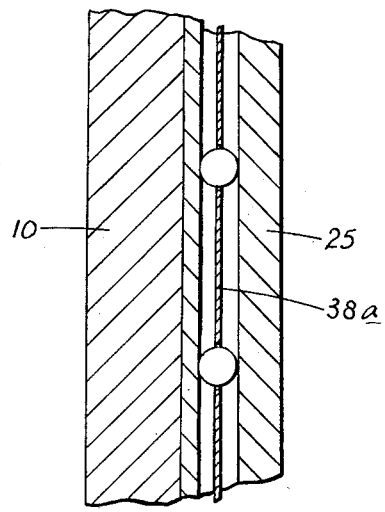
Figure 4:
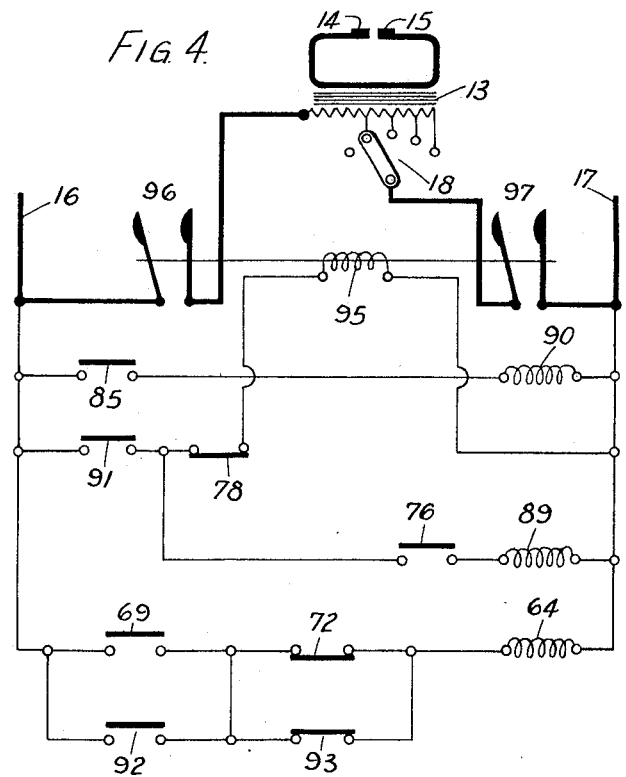
Figure 4 is an electrical circuit diagram of Figure 1.

The bed of the machine has a carriage or platen 19 fixed thereon at one end a sheet of insulating material 20 serving to insulate this carriage from the bed. A clamp 21 on the carriage 19 serves to carry a work piece such for example as shown at 22. The inner end of the carriage has a downwardly extending rigid conductor 23 attached thereto extending through a gap 24 in the bed. A sliding carriage 25 is secured centrally of the bed in a slidable manner by means of rollers as shown in Figures 2 and 3. Four sets of rollers 26, 27, 28 and 29 are employed rolling in grooves 31, 32, 33 and 34 of the bed and contacting hardened steel plates 35, 36, 37 and 38 in the carriage. The sets of rollers 27 and 28 fit in the bed to engage the plates 36 and 37 in the manner of a dovetail so that the carriage 25 may slide only longitudinally of the bed. Each set of rollers is maintained in correct spaced relation by a cage 38a. A clamp 39 is positioned on this sliding carriage to receive the work piece, for example that shown at 41, for welding to the work piece 22 held in clamp 21. The end of carriage 25 includes a rigid conductor 42 downwardly extending into the space 24 and disposed closely adjacent to conductor 23. The conductor 42 at its lower end is connected by a flexible conductor 43 to the secondary terminal 15 of the transformer. This flexible conductor is composed of a plurality of thin sheet metal conductors clamped together at their ends. The conductor 23 is connected by a connecting link 44 to the terminal 14 of the transformer secondary. The movable carriage has a pair of arms 45 extending downwardly therefrom each having a hole at its lower end in which is positioned a screw threaded rod 46 locked in position by a pair of screw nuts 47 and 48. Tension springs 49 are attached one to one end of each rod 46 and extending to brackets 51 attached to the bed 10 under the fixed carriage. The use of one spring 49 on each side of the bed makes the spring force acting on the sliding carriage 25 symmetrical. This spring force is the bias force and is adjustable by adjusting the position in which rods 46 are locked in their respective arms 45.

At the opposite end of the bed from the fixed carriage 19 a butt ram 52 is positioned slidable in a sleeve bearing 53 to urge the sliding carriage 25 to the left as seen in the drawings to push the work pieces 22 and 41 into contact. This ram is connected with the butt piston 54 operating in a butt cylinder 55. The connection is by a screw threaded rod 56 and a locking nut 57 whilst the range of movement of the ram is limited by two pairs of nuts 58 and 59 locked on either side of a stop 61 securely attached to the bed 10. On the top of the sliding carriage 25 near the butt ram 52 a bracket 62 is positioned carrying a drop block 63 slidable in a vertical sleeve in the bracket 62. Around this sleeve a drop block solenoid winding 64 is located its action when energised being to lift the drop block 63 to the position shown in the drawings. A limb 65 extends downwardly from the end of the sliding carriage under the bracket 62 and passes through a gap (not shown) disposed centrally in the bed. A return piston and cylinder unit 66 is located under the bed and the ram 67 extending therefrom can engage the limb 65 to return the sliding carriage from the position where the work pieces 22 and 41 engage one another. The limb 65 is limited in return movement by a stop 68 integrally formed in the interior of the bed. A return stop switch 69 mounted on the inside of the bed is actuated to break contact when the limb 65 contacts stop 68 by means of a spring pressed rod 71 slidably mounted in the stop 68. The drop block 63 is controlled by a switch 72 mounted on the sliding carriage, the screw threaded operating rod 73 thereof being secured to a bracket 74 on the butt ram and adjustable therein by means of lock nuts 75. This switch 72 is so arranged as to break circuit when the carriage has moved forward a predetermined amount from the butt ram. Under the end of the sliding carriage a butt valve switch 76 is positioned which is adapted to make circuit when the drop block 63 falls on to it. A small screw threaded rod 77 is secured to the side of the rod 56 extending between the butt piston 54 and the butt ram 52 this rod contacting a cut out switch 78 mounted on bracket 61 to break circuit when the rod 56 has moved forwardly a predetermined amount. The rod 77 is adjustable by means of lock nuts 79. A manual control handle 81 is mounted on the side of the machine and when held in the position shown in full lines operates a two way valve 82 to connect air pressure to pipe 83a from pipe 84 and exhaust pipe 83b to cause the ram 67 to move to the right to the position shown in the drawings to hold the limb 65 against stop 68. This position of the operating handle 81 also acts on the operating switch 85 to break the circuit through it. By pushing handle 81 to the position shown in broken lines causes ram 67 to be withdrawn and the switch 85 to move to a contact made position to put the machine into operation. The butt piston and cylinder are connected to air pressure and exhaust by means of pipes 86 and 87 extending from a two way valve 88 controlled by a solenoid 89. The valve 88 receives its air pressure from pipe 84.

The operation of this machine is as follows. With handle 81 in the return position shown in full lines operating switch 85 is in contact broken position. The work pieces 41 and 22 are secured in position on the carriage so that the surfaces to be welded have a small gap between them. By moving handle 81 to the operating position shown in broken lines the ram 67 is withdrawn leaving the sliding carriage free to move and also making the contact of the operating switch. In the circuit diagram of Figure 4 the supply mains connections are shown at 16 and 17. A relay comprising solenoid 90 and contacts 92, 93 and 91 forms an essential part of the apparatus and is shown only in the circuit diagram. The contact 92 which is normally open when solenoid 90 is unenergised is in parallel with the return stop switch 69. The contact 93 normally close when solenoid 90 of relay is unenergised is in parallel with drop block switch 72. The contact 91 normally open when solenoid 90 is unenergised makes a circuit through solenoid 95 of a contactor having contacts 96 and 97 which switch heavy current from the supply mains to the transformer primary. Thus when handle 81 is moved to the operative position, switch 85 energises solenoid 90 which in turn closes contact 91 energising solenoid 95 and closing contactor contacts 96 and 97 thus connecting the transformer primary to the supply mains. Also contacts 92 and 93 will be closed and opened respectively, the closing of contact 92 energising drop block solenoid 64 thus raising the drop block. The withdrawal of ram 67 allows the sliding carriage to move forwardly under the action of bias springs 49 so that the work pieces 22 and 41 touch allowing current to flow from the transformer secondary. This current produces magnetic repulsion between the conductors 23 and 42 urging the sliding carriage back against the bias spring force and at the same time initiating flashing between the surfaces of the work pieces. This flashing will proceed automatically the magnetic repulsion being balanced against the bias spring force. Assuming correct initial bias spring setting the current flowing from the transformer will be maintained at a steady high value usually about 75 per cent of the short circuit current and heat will be generated by the flashing at the maximum rate. Even though the work pieces tend to burn away adjustment for this is continuous since when the balance between repulsion and bias force varies the correction is immediate to restore balance. The amount of time for flashing is determined by the total movement of the carriage forwardly to compensate for burning away of the work pieces until the drop block can fall over the edge of the butt ram 52. The drop block is retained raised during the majority of the flashing operation by reason of the fact that return stop switch 69 and drop block switch 72 together control flow of electricity to solenoid 64. At the first forward movement of the carriage the return stop switch makes contact. The drop block switch 72 makes contact according to the presetting of rod 75 until the carriage has moved forward almost the desired amount. The switch 72 breaks contact when the carriage 25 has moved forward almost the determined amount and the drop block 63 falls into the space created between butt ram 52 and carriage 25. When the drop block reaches the bottom of its fall it operates the butt valve switch 76. It will be appreciated that the presetting of the butt ram position determines how far forward the carriage must move before the drop block falls and the arrangement is that the work piece surfaces where flashing is taking place are heated sufficiently to be in a plastic state for welding when the amount of metal to give this movement has burnt away.

The closing of the butt valve switch 76 completes a circuit to solenoid 89 which operates to supply air pressure to the butt cylinder 55 to urge the piston and butt ram to the left against the drop block. The drop block transmits the force to the sliding carriage to urge the heated surfaces of the work pieces together under high pressure to effect the weld. When the butt ram moves, the cut out switch 78 is operated to break the circuit to the contactor solenoid 95 thus disconnecting the transformer primary from the mains supply and preventing a continued short circuit of the secondary. The butt pressure is maintained whilst the weld cools and when the cooling is sufficient the clamps 21 and 39 are released manually and the handle 81 moved to the return position. In this position operating switch 85 is opened de-energising relay solenoid 90 so that contacts 91 and 92 open and contact 93 closes. Until the carriage 25 returns the return stop switch is closed and closing of contact 93 will complete the circuit to the drop block solenoid 64 raising it to allow the carriage to return completely. When limb 65 reaches the stop 68 the return stop switch 69 is opened breaking the circuit to the drop block solenoid so that no current is taken from the mains until the machine is again operated. When the valve solenoid 89 is de-energised by the lifting of the drop block 63 the valve 88 operates to withdraw the ram 52 and in the operation this opens the cut out switch 78.

It will be seen that the entire operation of making the welded joint is automatic from the clamping of the work pieces in position and operation of the handle 81 until the work pieces are unclamped after the weld is complete and that when the machine is set by a skilled operator an unskilled operator can take over and continue to make similar welds between similar work pieces.

Figure 5:
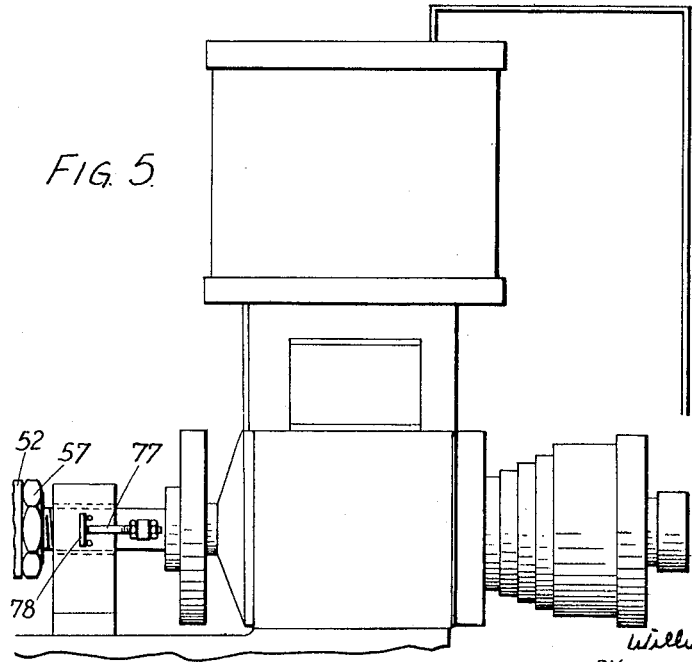
Figure 5 is a modification of the construction of Figure 1 using an intensifier unit for upsetting.

In the modification of Figure 5 the butt cylinder and piston shown in Figure 1 is replaced by an intensifier unit constructed and acting in the manner described in our copending application No. 7330/51 (U. S. application Serial No. 279,012). Briefly the purpose of this unit is to provide a high pressure for the butting operation which is not applied suddenly but gradually builds up to a maximum pressure.

Figure 6:
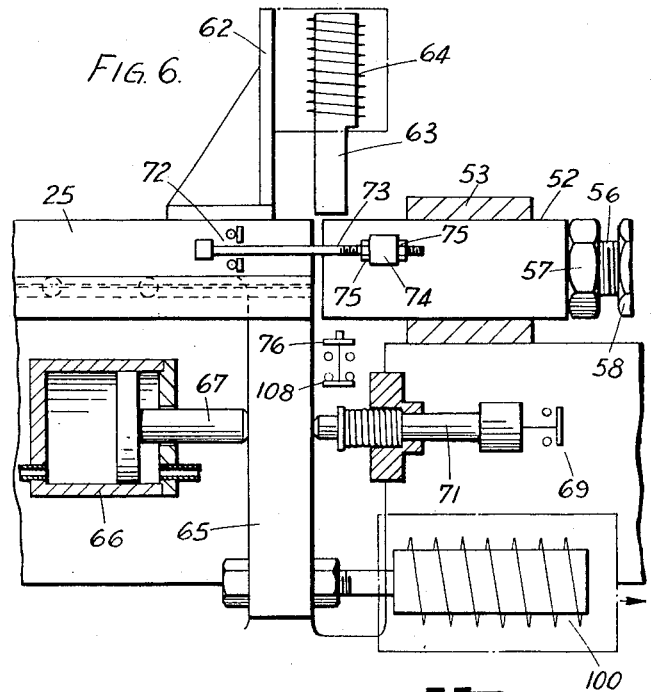
Figure 6 is a further modification of Figure 1 using a solenoid and magnetic amplifier to obtain repulsion.
Figure 7:
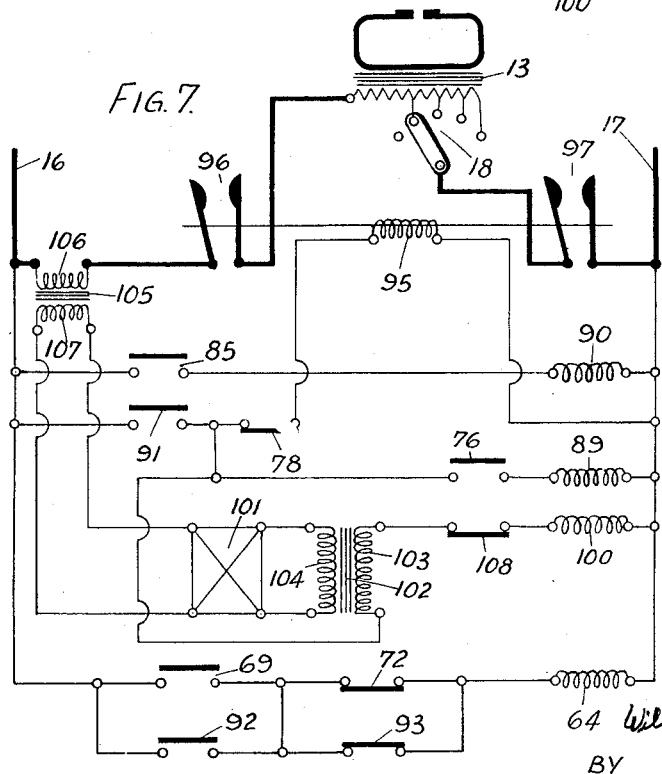
Figure 7 is the electrical circuit diagram of Figure 6.

In the modification of Figures 6 and 7 there is included in the machine of Figure 1 a device for applying an amplified repulsion force between the carriages to enable the machine to operate with heavy work pieces on the sliding carriage. In this modification the amplified force is supplied in addition to the magnetic repulsion developed in the construction of Figure 1. As shown in Figure 6 the device for applying the amplified force is the thrust solenoid 100 which acts on the limb 65 of the carriage 25 so that it pulls the carriage in a direction to part the work pieces. The circuit diagram is shown in Figure 7 and whilst it is basically similar to the circuit of Figure 4 it includes modifications for the insertion of a magnetic amplifier in the circuit to feed the solenoid 100. The magnetic amplifier comprises a rectifier 101 and a saturable choke 102 having a choke winding 103 and a control winding 104. The controlling current for the amplifier is supplied by means of a current transformer 105 having a primary current winding 106 in series with the mains connection 16 to the primary of the transformer. The secondary winding 107 supplies alternating current to the rectifier 101 which produces direct current in proportion to the supplied alternating current this direct current being fed to the control winding 104 of the choke 102. The action of the whole magnetic amplifier is well known and comprises merely saturation of the choke core by the passage of the direct current through the control winding 104 the degree of saturation determining the impedance or choking effect of the choke winding 103. The repulsion solenoid 100 is fed with current from the mains through the choke winding 103 the arrangement being such that when the primary current of the transformer 13 is high the direct current through winding 104 is high causing high saturation of the core and reduced impedance of choke winding 103 so that the solenoid 100 passes a high current and exerts a high repelling force on the sliding carriage 25. To operate the amplifier successfully it is necessary to modify the drop block switch 76 to include a further pair of contacts 108 normally closed but opened when the drop block 63 falls to initiate the butting or upsetting operation. The function of contact 108 is to disconnect the solenoid 100 so that it does not detract from the butting force. Other than operation of the repelling solenoid 100 the operation of this circuit and the modified machine is the same as that of Figures 1 to 4.

It will be appreciated that in these described constructions the action taking place during flashing is in its broadest sense an action where the flashing current is controlled to remain at an approximately constant value any disturbance acting to vary the current immediately being corrected by variation of the gap between the work pieces to bring the current back to approximately its steady value. The control of the gap in these embodiments has been by the balancing of a bias force against a repulsion force but there are other servo means by which the same result may be obtained.

Further, the described constructions represent embodiments of the invention belonging to a class where the flashing current is maintained substantially constant by balancing two constantly acting forces i. e. the bias force and the repelling force, one against the other so that the greater force acts to vary the relative position of the carriages. In the described construction the bias force is substantially constant whilst the repelling force varies in magnitude with the magnitude of the flashing.

In all embodiments of the invention it will be appreciated that the transformer supplying welding current may be loaded to give it optimum continuous current and that the fact that flashing is continuous without interruption means that heat is generated at the maximum possible rate at the surfaces to be welded thus allowing the least possible time for heat to dissipate into the body of the work piece. Thus the quantity of electricity used is reduced as compared with known methods for a given weld and in certain cases preheating may be dispensed with.

I claim:

1. An apparatus for flash butt welding the surface of two metal workpieces including a pair of carriages movable relatively to one another, a mounting on each carriage to receive a workpiece, electric flashing current supply means to the carriages and magnetic force exerting means to adjust the spacing of the carriages in accordance with the electric current flowing to tend to maintain the flashing current constant, said magnetic force exerting means acting without time lag in accordance with variations of the flashing current.

2. An apparatus as claimed in claim 1 including a constantly acting force exerting means acting on the carriages in opposition to the magnetic force exerting means so that the difference of the forces exerted by the said two means act to adjust the carriage spacing.

3. A flash butt welding apparatus as claimed in claim 1, wherein the magnetic force exerting means comprises two rigid conductors rigidly associated one with each carriage and so disposed that they are normally in closely adjacent relation, these conductors being connected to carry flashing current to and from the carriages, the magnetic repulsion of the flashing current flowing in these conductors then acting on the carriages to urge them apart.

4. A flash butt welding apparatus as claimed in claim 1, wherein the magnetic force exerting means comprises a solenoid so secured to the carriages that when energised it urges the carriages apart, and a magnetic amplifier connected to control the energising current through the solenoid so that its magnitude varies in accordance with the magnitude of the flashing current.

5. A flash butt welding apparatus as claimed in claim 1, wherein the magnetic force exerting means comprises two rigid conductors associated one with each carriage and so disposed that they are normally in closely adjacent relation, these conductors being connected to carry flashing current to and from the carriages, a solenoid so secured to the carriages that when energised it urges the carriages apart and a magnetic amplifier connected to control current through the solenoid in accordance with the magnitude of the flashing current, the total force urging the carriages apart being the sum of the magnetic repelling force acting between the two rigid conductors and the force exerted by the solenoid.

6. A flash butt welding apparatus as claimed in claim 1, wherein the constantly acting force exerting means comprises a spring acting in tension between the two carriages to pull them toward each other.

7. A flash butt welding apparatus for welding two metallic work pieces together including a machine bed, a first carriage fixedly mounted on said bed but electrically insulated therefrom, a second carriage slidably mounted on said bed, a clamp secured to each carriage to receive a work piece, constantly acting force exerting means to urge the second carriage toward the first carriage and magnetic force exerting means to urge the second from the first carriage in accordance with the magnitude of the electric flashing current passing between the two carriages, variation in the flashing current resulting in immediate variation of the magnetic force to tend to maintain the flashing current constant.

8. A flash butt welding apparatus as claimed in claim 7 including a butting unit mounted on the bed, a drop block positioned over the second carriage and butting unit and positioned to fall between the second carriage and the butting unit when the second carriage has moved a predetermined distance toward the first carriage, and control means sensitive to the fall of the drop block to cause the butting unit to operate to urge the second carriage strongly toward the first carriage, the force exerted being transmitted through the drop block.

9. A flash butt welding apparatus comprising a machine bed, a first carriage fixedly mounted on the bed but electrically insulated therefrom, a second carriage slidable on the bed, a work holding clamp on each carriage, a tension spring secured between the two carriages to urge the second carriage toward the first carriage, an electric conductor secured to each carriage for the supply of electric flashing current to and from the carriages, magnetic force exerting means acting on the second carriage to urge it away from the first carriage with a force dependent in magnitude on the magnitude of the flashing current, a butt unit for applying a butting force to the second carriage, a drop block positioned over the second carriage and the butt unit to fall between the second carriage and the butt unit when the former has moved a predetermined distance toward the first carriage, a butt operating switch operated by the fall of the drop block, a two position manual control having operating and return positions, a returning means for the second carriage operated by said manual control in the return position, an operating switch controlled by the manual control in the operating position to cause flashing current to be supplied to said carriages, a lifting means for said drop block energised by said operating switch when the manual control is in the return position.

10. A flash butt welding apparatus as claimed in claim 8 including a solenoid capable when energized of lifting the drop block, switch means to energize the solenoid, and a manual control to effect forward or return movement of the second carriage, said switch means being operable to energize the solenoid by the manual control when set in the return position.

11. An apparatus for flash butt welding the surfaces of two metal work pieces that comprises a pair of carriages moveable relative to one another, and normally biased toward each other, means on each carriage to support one of said work pieces, means to supply electric flashing current to each carriage, said supply means including a current responsive means associated with each carriage, each current responsive means generating a magnetic field of like polarity, said field being of a magnitude depending on the amplitude of said flashing current, whereby said current responsive means repel each other and said carriages against said normay biases, a varying amount depending on the amplitude of said flashing current.

References Cited in the file of this patent

UNITED STATES PATENTS

| | | |
|---|---|---|
| 1,228,843 | Spire | June 5, 1917 |
| 1,654,562 | Taylor | Jan. 3, 1928 |
| 2,049,312 | Palmer | July 28, 1936 |
| 2,386,261 | Redmond | Oct. 9, 1945 |
| 2,404,620 | Cooper | July 23, 1946 |

FOREIGN PATENTS

| | | |
|---|---|---|
| 475,238 | Great Britain | Nov. 16, 1937 |